(12) United States Patent
Nishita

(10) Patent No.: US 11,536,568 B2
(45) Date of Patent: Dec. 27, 2022

(54) TARGET INSTRUMENT AND SURVEYING SYSTEM

(71) Applicant: TOPCON Corporation, Tokyo-to (JP)

(72) Inventor: Nobuyuki Nishita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 731 days.

(21) Appl. No.: 16/558,574

(22) Filed: Sep. 3, 2019

(65) Prior Publication Data

US 2020/0141729 A1 May 7, 2020

(30) Foreign Application Priority Data

Sep. 6, 2018 (JP) .............................. JP2018-166578

(51) Int. Cl.
| | |
|---|---|
| *G01C 15/00* | (2006.01) |
| *G01S 7/481* | (2006.01) |
| *G01C 3/08* | (2006.01) |
| *G01S 17/42* | (2006.01) |
| *G01S 17/89* | (2020.01) |

(52) U.S. Cl.
CPC ............. *G01C 15/006* (2013.01); *G01C 3/08* (2013.01); *G01S 7/4817* (2013.01); *G01S 17/42* (2013.01); *G01S 17/89* (2013.01)

(58) Field of Classification Search
CPC .......... G01C 15/006; G01C 3/08; G01C 9/24; G01C 15/008; G01C 15/06; G01S 7/4817; G01S 17/42; G01S 17/89; G01S 17/66
See application file for complete search history.

(56) References Cited

U.S. PATENT DOCUMENTS

| | | | |
|---|---|---|---|
| 2016/0238385 A1 | 8/2016 | Ohtomo et al. | |
| 2016/0238708 A1 | 8/2016 | Ohtomo et al. | |
| 2016/0259039 A1 | 9/2016 | Ohtomo et al. | |
| 2017/0227357 A1 | 8/2017 | Ohtomo et al. | |
| 2018/0224549 A1* | 8/2018 | Yoshino | ............... G01B 11/002 |

FOREIGN PATENT DOCUMENTS

| | | |
|---|---|---|
| JP | 2006-162444 A | 6/2006 |
| JP | 2015-230229 A | 12/2015 |
| JP | 2016-151422 A | 8/2016 |
| JP | 2016-151423 A | 8/2016 |
| JP | 2016-161411 A | 9/2016 |
| JP | 2017-142081 A | 8/2017 |

* cited by examiner

*Primary Examiner* — Nam D Pham
(74) *Attorney, Agent, or Firm* — Nields, Lemack & Frame, LLC

(57) ABSTRACT

A surveying system comprises a laser scanner for scanning a distance measuring light and for acquiring point cloud data and a target instrument having a target for reflecting the distance measuring light, wherein the target is a sphere having a known diameter, the laser scanner comprises a distance measuring module for projecting the distance measuring light, for receiving a reflected distance measuring light and for performing a distance measurement, an optical axis deflector which enables to two-dimensionally deflect the distance measuring light, and an arithmetic control module for controlling the optical axis deflector, and wherein the arithmetic control module is configured to perform a circular scan on a surface of the target by the optical axis deflector, to obtain a center of the target based on the point cloud data acquired by the circular scan and the diameter, and to measure a distance of the center of the target.

8 Claims, 9 Drawing Sheets

TARGET INSTRUMENT AND SURVEYING SYSTEM

BACKGROUND OF THE INVENTION

The present invention relates to a target instrument which enables to track a target and a surveying system including the target instrument.

As a surveying instrument for performing a shape measurement of an object to be measured, there is a laser scanner. Generally, the laser scanner horizontally rotates while rotary irradiating a laser beam as a distance measuring light in a vertical direction and acquires point cloud data of an entire circumference.

On the other hand, in a case where a target is installed at a measuring point and the target is measured or a measurement is required regarding a plurality of measuring points, the target is sequentially moved to and installed at the plurality of measuring points, and the target is measured per each measuring point. In this case, it is required for the measuring instrument to highly accurately measure the target at rest and also to have a tracking function to track the moving target.

Conventionally, the laser scanner does not have the tracking function and cannot track a target and sequentially measure a plurality of measuring points.

SUMMARY OF THE INVENTION

It is an object of the present invention to provide a target instrument which enables to track a target by a laser scan and a surveying system which has functions of a laser scanner and enables to track and measure the target.

To attain the object as described above, a target instrument according to the present invention comprises a pole and a spherical target which is provided on the pole and reflects a distance measuring light, wherein the target has a known diameter, a center of the target is positioned on an axis of the pole, and a distance between the center of the target and a lower end of the pole is known.

Further, in the target instrument according to a preferred embodiment, an air bubble tube is provided on the pole.

Further, a surveying system according to the present invention comprises a laser scanner for scanning a distance measuring light and for acquiring point cloud data and a target instrument having a target for reflecting the distance measuring light, wherein the target is a sphere having a known diameter, the laser scanner comprises a distance measuring module for projecting the distance measuring light, for receiving a reflected distance measuring light and for performing a distance measurement, an optical axis deflector which enables to two-dimensionally deflect the distance measuring light, and an arithmetic control module for controlling the optical axis deflector, and wherein the arithmetic control module is configured to perform a circular scan on a surface of the target by the optical axis deflector, to obtain a center of the target based on the point cloud data acquired by the circular scan and the diameter, and to measure a distance of the center of the target.

Further, in the surveying system according to a preferred embodiment, with respect to the moving target, the optical axis deflector is configured to direct a center of the circular scan to the center of the target in such a manner that distance measurement values of an entire circumference obtained by the circular scan become equal to each other.

Further, in the surveying system according to a preferred embodiment, the target instrument further comprises a pole of which end indicates a measuring point and an air bubble tube provided on the pole, wherein the center of the target is positioned on an axis of the pole and is provided at a known position from the end of the pole, and wherein the laser scanner is configured to measure the center of the target and to carry out a measurement of the measuring point in a state where the pole is vertically supported.

Further, in the surveying system according to a preferred embodiment, the optical axis deflector includes a biaxial galvanometer mirror.

Further, in the surveying system according to a preferred embodiment, the optical axis deflector has a reference optical axis, the optical axis deflector comprises a pair of optical prisms rotatable around the reference optical axis and motors which individually and independently rotate the optical prisms, and wherein the arithmetic control module is configured to control a deflection of a distance measuring light by the optical axis deflector by controlling a rotating direction, a rotation speed and a rotation ratio of the pair of optical prisms, to perform a two-dimensional scan with a scan center optical axis as a center, and to control a deflection of the scan center optical axis with respect to the reference optical axis.

Further, in the surveying system according to a preferred embodiment, the arithmetic control module is configured to scan the distance measuring light in a scan pattern with at least one intersection or to scan the distance measuring light in a circular pattern by the optical axis deflector.

Further, in the surveying system according to a preferred embodiment, the arithmetic control module is configured to scan the distance measuring light by the optical axis deflector in such a manner that the intersection is formed on the target and a part of the scan pattern crosses the pole, to obtain the center of the target based on the point cloud data acquired by scanning the target, to carry out a measurement of the target, and to measure a tilt of the pole based on the center of the target and a distance measurement value obtained by crossing the pole.

Furthermore, in the surveying system according to a preferred embodiment, the arithmetic control module is configured to carry out a sighting and a tracking of the target by the circular scan and to carry out a measurement of the target in a scan pattern with at least one intersection.

According to the present invention, the target instrument comprises a pole and a spherical target which is provided on the pole and reflects a distance measuring light, wherein the target has a known diameter, a center of the target is positioned on an axis of the pole, and a distance between the center of the target and a lower end of the pole is known. As a result, the target has no directionality, the target can be measured from all directions, and the center of the target can be measured only by the distance measurement value.

Further, according to the present invention, the surveying system comprises a laser scanner for scanning a distance measuring light and for acquiring point cloud data and a target instrument having a target for reflecting the distance measuring light, wherein the target is a sphere having a known diameter, the laser scanner comprises a distance measuring module for projecting the distance measuring light, for receiving a reflected distance measuring light and for performing a distance measurement, an optical axis deflector which enables to two-dimensionally deflect the distance measuring light, and an arithmetic control module for controlling the optical axis deflector, and wherein the arithmetic control module is configured to perform a circular scan on a surface of the target by the optical axis deflector, to obtain a center of the target based on the point cloud data acquired by the circular scan and the diameter, and to measure a distance of the center of the target. As a result, the target has no directionality, the target can be measured from all directions, and the center of the target can be measured only by the distance measurement value.

DETAILED DESCRIPTION OF THE PREFERRED EMBODIMENTS

A description will be given below on embodiments of the present invention by referring to the attached drawings.

Figure 1:
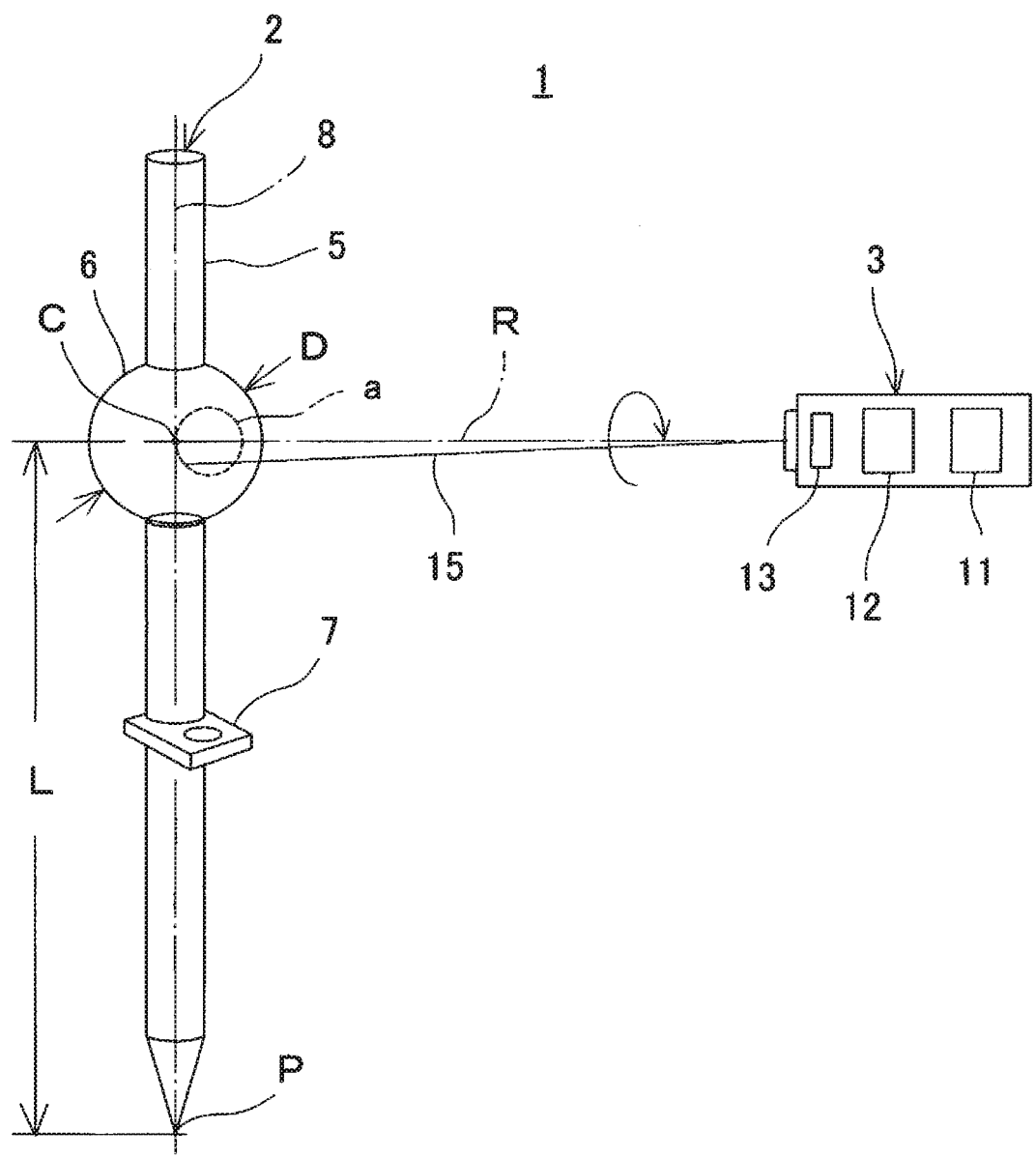
FIG. 1 is a system schematical drawing according to a first embodiment of the present invention.

FIG. 1 is a schematical drawing to show a first embodiment according to the present invention.

In FIG. 1, a reference numeral 1 denotes a surveying system according to the present embodiment, a reference numeral 2 denotes a target instrument used in the surveying system, and a reference numeral 3 denotes a laser scanner.

First, a description will be given on the target instrument 2.

The target instrument 2 has a pole 5 of which lower end is a sharp tip in such a manner that the sharp tip indicates a measuring point "P", a spherical target 6 provided at a predetermined position on the pole 5, and an air bubble tube 7 provided at a required position on the pole 5.

A diameter "D" of the target 6 is a size corresponding to a measuring environment and is a known value, for instance, 10 cm. Further, the target 6 may be attachable and detachable to and from the pole 5 and may be replaced with a target 6 having a different size.

A center "C" of the target 6 is positioned on an axis 8 of the pole 5, and a distance "L" from the lower end of the pole 5 to the center "C" of the target 6 is known.

The air bubble tube 7 is provided on the pole 5 in such a manner that the air bubble tube 7 indicates the horizontal when the pole 5, that is, the axis 8 is vertical.

A surface of the target 6 may be white with high reflectivity in such a manner that the surface of the target 6 reflects a distance measuring light from the laser scanner 3, or may be covered with a reflection sheet having high reflectivity, or may be coated with a paint in which microprisms are mixed (hereinafter referred to as a reflective paint).

Further, required ranges of the pole 5 extending upwardly and downwardly from the target 6 are white, or covered with a reflection sheet, or coated with a reflective paint like the target 6. It is to be noted that the pole 5 may be white, or may be coated with a reflection sheet, or may be coated with a reflective paint over the entire length.

As the laser scanner 3, a laser scanner is used, which has a function capable of performing a local scan and a circular scan.

A brief description will be given on the laser scanner 3. The laser scanner 3 mainly has an arithmetic control module 11, a distance measuring module 12 and a distance measuring light deflecting module 13.

The distance measuring module 12 projects a pulsed light, or an intermittent modulated light (that is, a burst light) disclosed in Japanese Patent Application Publication No. 2016-161411, as a distance measuring light 15, receives a reflected distance measuring light reflected by the target 6, and measures a distance to an object to be measured based on a time difference between a light emission timing and a light reception timing of the distance measuring light and on a light velocity. The distance measuring module 12 functions as an EDM. The distance measuring light 15 may be any one of a visible light or an invisible light.

Figure 2A:
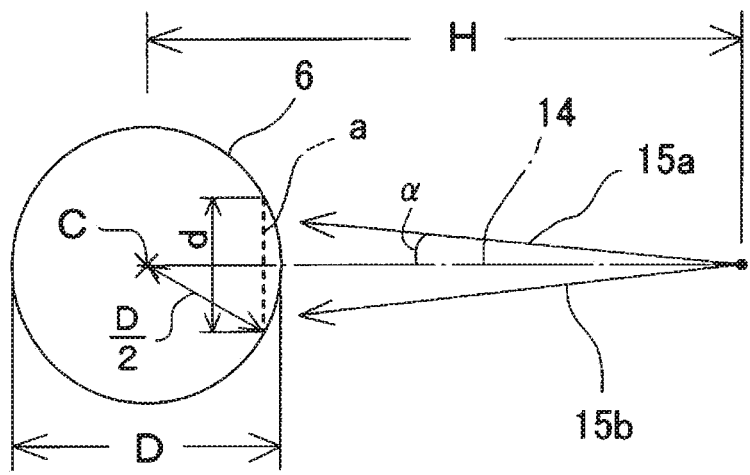
FIG. 2A, FIG. 2B and FIG. 2C are explanatory drawings to show a relationship between a circular scan and a target in the first embodiment.
Figure 2B:
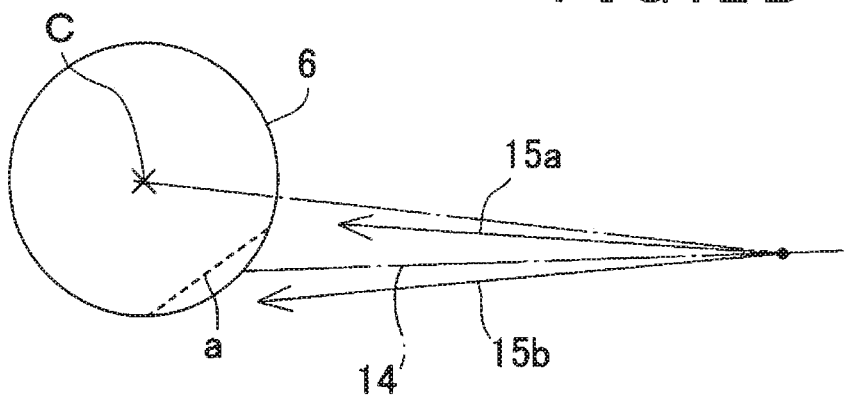
Figure 2C:
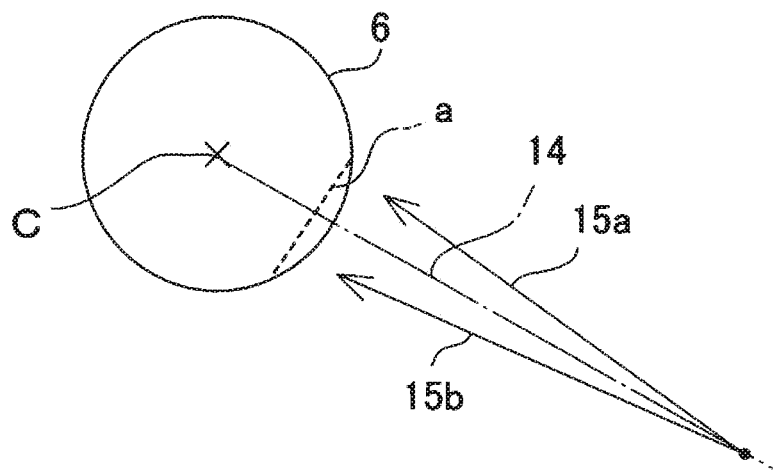

In the distance measuring light deflecting module 13, a scan center in a state where a two-dimensional scan is performed is determined as a scan center optical axis 14 (see FIG. 2A, FIG. 2B and FIG. 2C). The distance measuring light deflecting module 13 has a function to deflect the distance measuring light 15 to two axes (horizontal/vertical) with respect to the scan center optical axis 14 and to scan the distance measuring light 15 in a required pattern. It is to be noted that an optical axis in a state where there is no deflecting action by the distance measuring light deflecting module 13 is determined as a reference optical axis "R".

It is to be noted that, as the distance measuring light deflecting module 13, an optical axis deflection unit can be used, which is constituted of a pair of disk optical prisms, wherein the optical axis deflection unit is included in a surveying instrument which is disclosed in Japanese Patent Application Publication No. 2016-151422. Alternatively, as the distance measuring light deflecting module 13, a deflecting means using a biaxial galvanometer mirror can be used.

It is to be noted that the deflecting means using the biaxial galvanometer mirror is disclosed in, for instance, Japanese Patent Application Publication No. 2015-230229.

The arithmetic control module 11 mainly has a CPU, a storage module, an input/output control module and the like, controls the distance measuring module 12, and performs a distance measurement. Further, the arithmetic control module 11 controls the distance measuring light deflecting module 13, deflects the distance measuring light 15 to two axes, which are a horizontal axis and a vertical axis, and scans the distance measuring light 15 in a required pattern.

It is to be noted that a two-dimensional pattern is carried out as a scan pattern, and a circular pattern is carried out, for instance. Further, while carrying out a circular pattern scan, the arithmetic control module 11 controls a size of the diameter "d" of the circular pattern in such a manner that the circular pattern is formed on a spherical surface of the target 6.

Further, while carrying out the scan, the distance measurement is performed per each pulse, and point cloud data is acquired along a pattern locus. It is to be noted that, in FIG. 1, a point in a broken line on the target 6 shows a measuring point.

A description will be given below on an action by referring to FIG. 2A, FIG. 2B and FIG. 2C. Further, in the following description, the distance measuring light 15 is the visible light.

The target instrument 2 is vertically erected and provided on a measuring point "P". Whether the target instrument 2 is vertical is confirmed by the air bubble tube 7.

The target 6 is sighted by the laser scanner 3. At this time, a state where the laser scanner 3 sights the target 6 means a state where the scan center optical axis 14 passes through the center "C" of the target 6.

The laser scanner 3 is directed toward the target 6 and projects the distance measuring light 15. Further, the distance measuring light 15 is circularly scanned. It is to be noted that a speed of the circular scan at this moment can be selected in accordance with a measuring state, for instance, tens of Hz (an arbitrary speed in a range of 10 Hz to 60 Hz).

When the circular scan is approximately scanned on the target 6, the measurement is started.

The laser scanner 3 itself is fixed, and a sighting or a tracking is carried out by the deflecting action of the distance measuring light deflecting module 13 during the measurement.

FIG. 2A shows a state where the sighting is accurately carried out, and FIG. 2B shows a state where the sighting is inaccurately carried out.

In the state where the sighting is accurately carried out, since the target 6 is a sphere, a shape of the circular scan "a" is a true circle, and all point cloud data acquired by the circular scan "a" have the same distance measurement value. For instance, the distance measurement values by a distance measuring light 15a and a distance measuring light 15b in FIG. 2A become equal to each other.

Further, when a deflection angle "α" with respect to the scan center optical axis 14 is controlled by the distance measuring light deflecting module 13 based on the distance measurement value of the distance measuring light 15a or the distance measuring light 15b, the diameter "d" of the circular scan can be set to a required known value.

Based on the diameter "d" of the circular scan, the fact that the target 6 is a sphere, the diameter "D" of the target 6 (the sphere), and a geometric relationship between the circular scan "a" and the sphere, a position of the center "C" is obtained, and a horizontal distance "H" between an installation point of the laser scanner 3 and the center "C" is measured.

Although various methods for calculating the horizontal distance "H" can be considered, the horizontal distance "H" is obtained as follows, for instance:

$$H=(\sqrt{[15a^2\ (15a=\text{distance measurement value of the distance measuring light})-(d/2)^2]})+(\sqrt{[(D/2)^2-(d/2)^2]}),\text{ or}$$

$$H=15a\cdot\cos\alpha+(D/2)\cos\beta\ (\text{here, }\beta=\arcsin(d/D))$$

As shown in FIG. 2B, when the sighting is inaccurately carried out, the distance measurement value of the point cloud data obtained by the circular scan "a" differs depending on each position. For instance, as shown in FIG. 2B, the distance measurement values of the distance measuring light 15a and the distance measuring light 15b are different.

By comparing the distance measurement values of the distance measuring lights 15a and 15b, it can be judged that in which direction the scan center optical axis 14 deviates with respect to the center "C". In the example of FIG. 2B, the scan center optical axis 14 deviates downward. Therefore, the arithmetic control module 11 upwardly rotates the scan center optical axis 14 by the distance measuring light deflecting module 13 in such a manner that the distance measurement values of the distance measuring lights 15a and 15b coincide with each other.

Thus, the sighting can be accurately carried out only with the circular scan "a". Further, the target 6 can be measured without stopping a scan operation.

Next, in a case where the measurement of the measuring point "P" is completed and a next measuring point is to be measured, the worker holds the pole 5 and moves to the next measuring point.

As described above, when the scan center optical axis 14 deviates from the center "C", a deviation is occurred in the distance measurement values on an entire circumference of the circular scan. Further, it can be judged by this deviation that in which direction the target 6 moves. Therefore, while performing the circular scan "a" by the distance measuring light deflecting module 13, the arithmetic control module 11 performs a distance measurement in real time by the distance measuring module 12, and the arithmetic control module 11 controls the distance measuring light deflecting module 13 in such a manner that the distance measurement values are always the same on the entire circumference of the circular scan. And thereby, the tracking is enabled.

It is to be noted that, in case of carrying out the tracking, even in a case where the diameter "d" of the circular scan "a" is set to, for instance, ½ of the diameter "D" of the target 6 and the scan center optical axis 14 slightly deviates from the center C, the tracking is enabled.

Next, FIG. 2C shows a state where the target 6 moves and its direction changes with respect to the laser scanner 3.

Since the target 6 is a sphere, the scan center optical axis 14 can pass through the center "C" irrespective of a direction from which the sighting is carried out. Further, in a state where the scan center optical axis 14 passes through the center "C", a shape of the circular scan "a" becomes a true circle, and distance measurement data of the circular scan "a" becomes equal.

That is, no matter in which direction the target 6 moves, no matter in which direction the pole 5 tilts, and further even if the target instrument 2 rotates around the axis 8, the scan center optical axis 14 can be matched with the center "C" by the distance measuring light deflecting module 13. That is, by controlling a deflection of the distance measuring light deflecting module 13 by the arithmetic control module 11, it is possible to track the target 6.

Figure 3A:
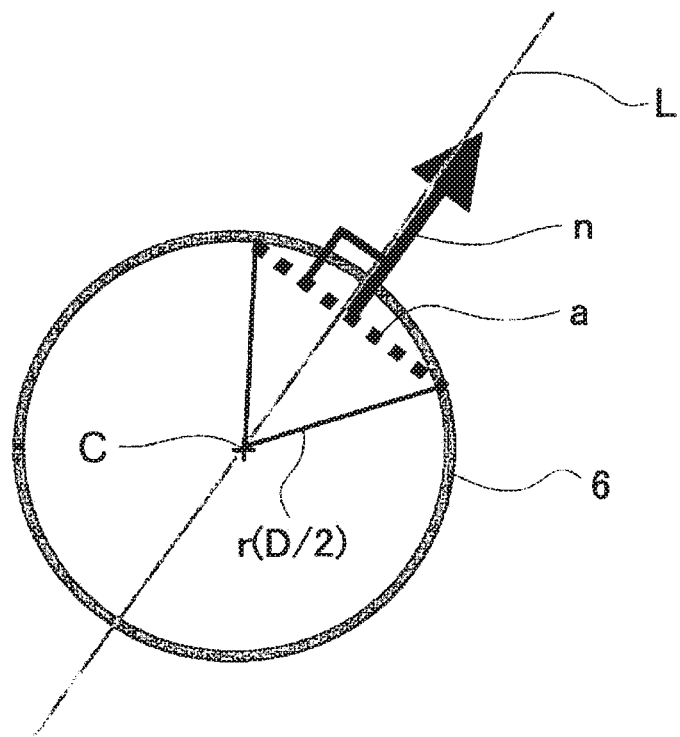
FIG. 3A and FIG. 3B are explanatory drawings to show another method for obtaining a center of the target by the circular scan.
Figure 3B:
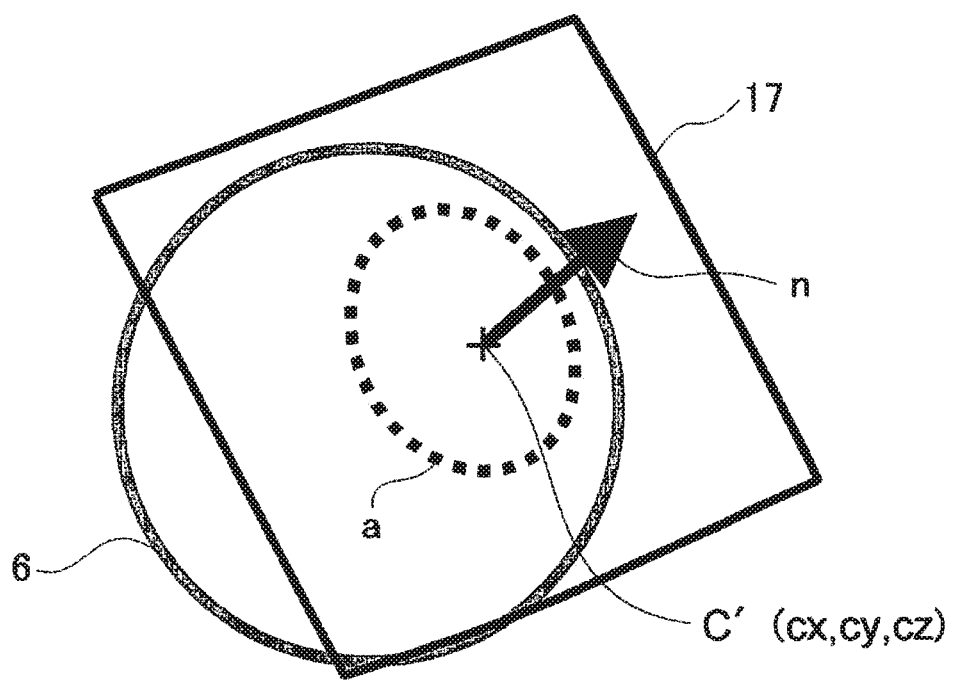

Further, a description will be given on another example of a method for obtaining the center "C" of the target 6 by referring to FIG. 3A and FIG. 3B.

A "surface 17 running through a point cloud" and a "center "C" of a circle" (a center of a locus circle of the circular scan) are obtained based on the point cloud data acquired by the circular scan "a". The surface 17 is represented by a vector "n" (nx, ny, nz) in a normal line. A center "P" of a sphere (the target 6) is positioned on a three-dimensional straight line "L" which coincides with this vector "n" and runs through the center "C'" (cx, cy, cz) of the circle. That is, when a point which exists on the straight line "L" and is apart from the measured point cloud by a radius "r" (D/2) of the sphere is obtained, this point is the center "C" of the sphere.

Next, as an application example of the target instrument 2, the target instrument 2 can be disposed to a heavy machine, for instance, a construction machine such as a bulldozer or an agricultural machine such as a tractor, and the target instrument 2 can be used for a positional measurement of the heavy machine during work. Further, the target instrument 2 may be used for a work management of the heavy machine based on the positional measurement.

It is to be noted that, in a case where the target instrument 2 is used for the heavy machine, a precise positional measurement is not required, and hence the air bubble tube 7 can be omitted.

Next, a description will be given on a second embodiment by referring to FIG. 4, FIG. 5 and FIG. 6. It is to be noted that, in FIG. 4, FIG. 5 and FIG. 6, what are equivalent to the components as shown in FIG. 1 are referred to by the same symbols, and a description thereof will be omitted.

Figure 4:
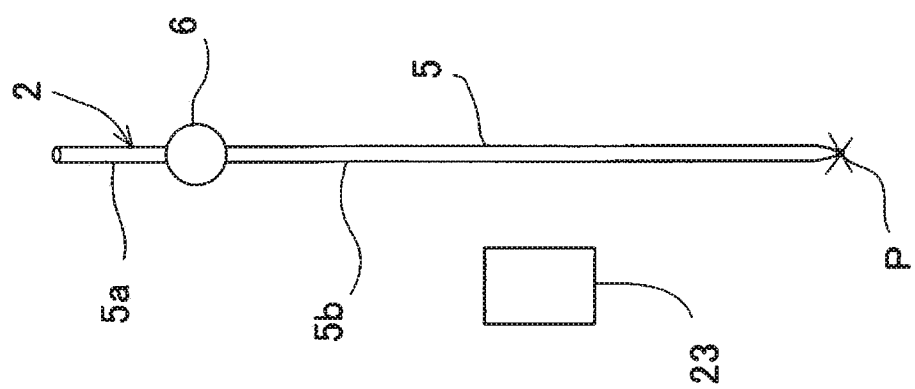
FIG. 4 is a system schematical drawing according to a second embodiment of the present invention.
Figure 4:
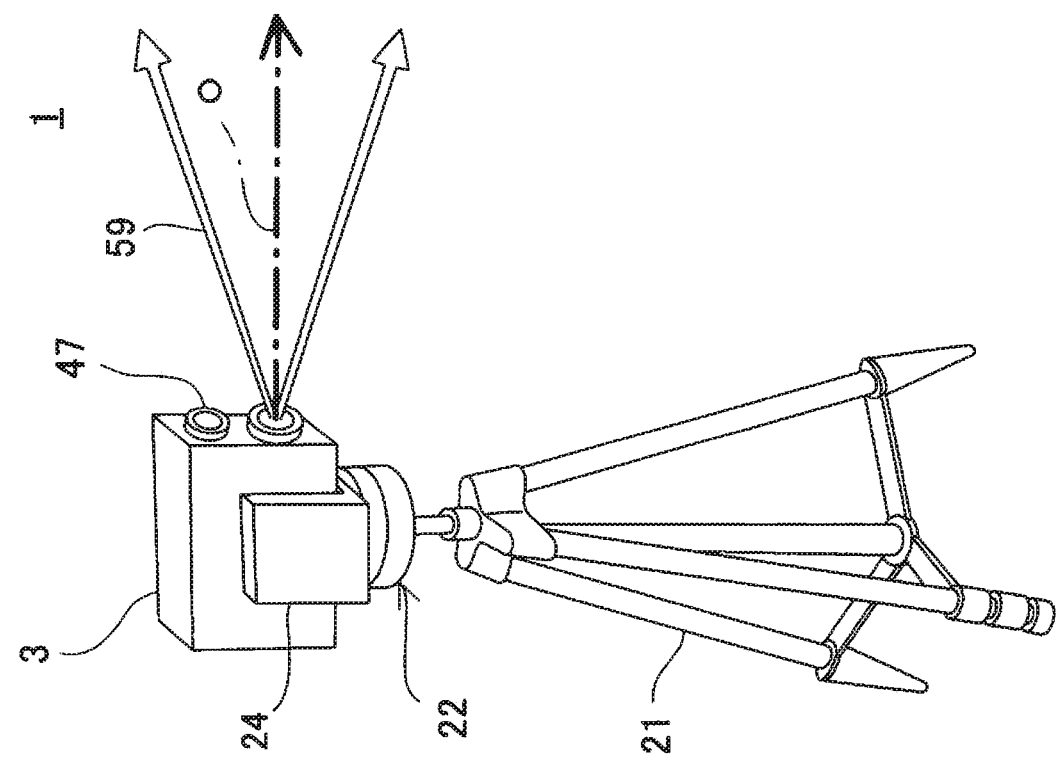
Figure 5:
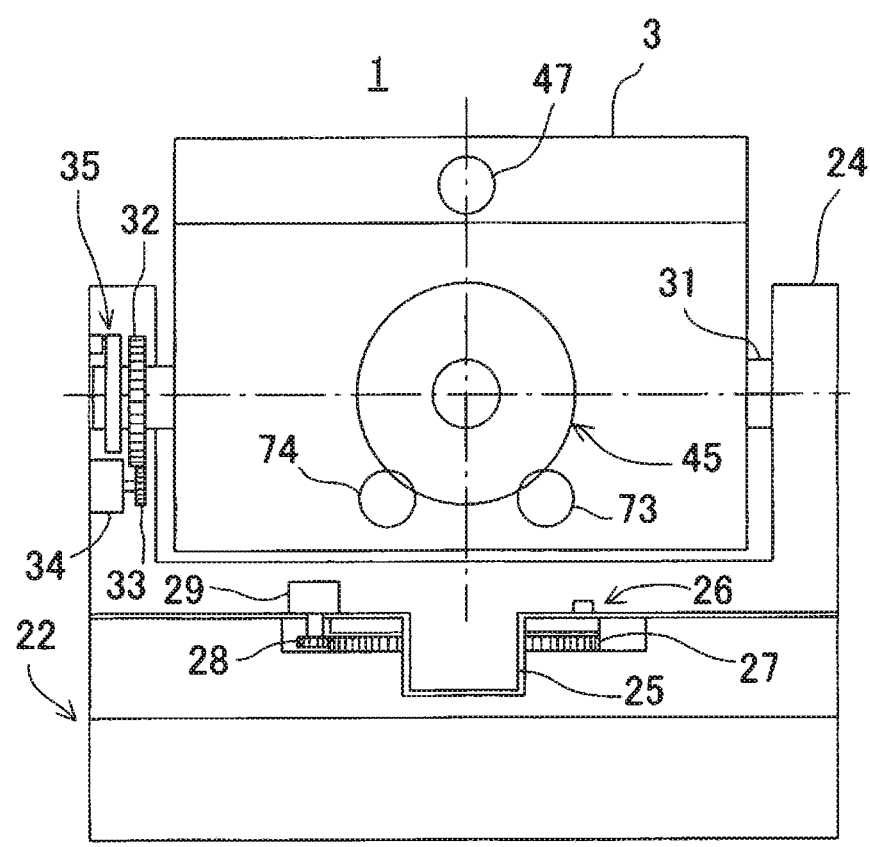
FIG. 5 is a front view of a laser scanner in the second embodiment.

In FIG. 4, a reference character "O" denotes a distance measuring optical axis in a state where an optical axis is not deflected, and the distance measuring optical axis at this time is determined as a reference optical axis.

A surveying system 1 according to the second embodiment mainly has a tripod 21 as a supporting unit, a laser scanner 3, an installation base 22 on which the laser scanner 3 is mounted, a target instrument 2 installed at a measuring point "P", and a terminal 23 capable of remotely operating the laser scanner 3.

As the terminal 23, a device which is handheld and has a display function, a communicating function and an arithmetic processing function, for instance, a smartphone, a tablet, a notebook computer, or the like is used, and the terminal 23 transmits an instruction regarding a measurement to the laser scanner 3, receives measurement data, image data, or the like, as acquired by the laser scanner 3, and executes a data storage, a data display, a data processing, and the like.

The installation base 22 is mounted on an upper end of the tripod 21, and the laser scanner 3 is provided on the installation base 22. The installation base 22 rotatably supports the laser scanner 3.

The target instrument 2 has a configuration equivalent to a configuration of the target instrument 2 as shown in FIG. 1, but an air bubble tube 7 is omitted. A reflection sheet having the optical characteristics to retro-reflect is preferably attached to a surface of a target 6, and the reflection sheet having the optical characteristics to retro-reflect is likewise attached to a pole 5. Instead of the reflection sheet, a reflective paint may be coated.

Further, a thickness (diameter) of an upper part 5a of the pole 5 above the target 6 may be different from a thickness (diameter) of a lower part 5b of the pole 5 below the target 6. When the upper part and the lower part of the pole 5 have the different thicknesses, the up and down of the target instrument 2 can be determined. Further, the diameters of the upper part 5a and the lower part 5b of the pole 5 are known values. It is to be noted that, as a target instrument 2 for short distances, a white paint or a reflective paint may be coated to the surface of the target 6 and the pole 5.

A frame unit 24 is provided on the installation base 22 capable of rotating in a horizontal direction. A horizontal rotation shaft 25 is projected from a lower surface of the frame unit 24, and the horizontal rotation shaft 25 is rotatably fitted to the installation base 22 via a bearing (not shown). The frame unit 24 is rotatable around the horizontal rotation shaft 25 in the horizontal direction.

Further, a horizontal angle detector 26 (an encoder, for instance) for detecting a horizontal angle (an angle in a rotating direction around the horizontal rotation shaft 25) is provided between the horizontal rotation shaft 25 and the installation base 22. A relative rotation angle of the frame unit 24 in the horizontal direction with respect to the installation base 22 is detected by the horizontal angle detector 26.

A horizontal rotation gear 27 is fixed to the installation base 22 concentrically with the horizontal rotation shaft 25, and a horizontal pinion gear 28 is meshed with the horizontal rotation gear 27. A horizontal motor 29 as a horizontal rotary driving module is provided on the frame unit 24, an output shaft of the horizontal motor 29 is projected downward, and the horizontal pinion gear 28 is fixed to the output shaft of the horizontal motor 29.

The horizontal pinion gear 28 is rotated by driving the horizontal motor 29 and the horizontal pinion gear 28 revolves around the horizontal rotation gear 27. Further, since the horizontal motor 29, the frame unit 24 and the laser scanner 3 are integrated, the laser scanner 3 is rotated around the horizontal shaft 25 by the horizontal motor 29 in the horizontal direction.

The laser scanner 3 is mounted on the frame unit 24. The laser scanner 3 is supported by the frame unit 24 via a vertical rotation shaft 31 which has a horizontal axis extending in the horizontal direction, and the laser scanner 3 is capable of rotating freely in the vertical direction around the vertical rotation shaft 31.

A vertical rotation gear 32 is fixed to one end of the vertical rotation shaft 31, and a pinion gear 33 is meshed with the vertical rotation gear 32. A vertical motor 34 is provided on the frame unit 24 as a vertical rotary driving module, and the pinion gear 33 is fixed to an output shaft of the vertical motor 34. When the vertical motor 34 is driven, the laser scanner 3 is rotated in the vertical direction via the pinion gear 33, the vertical rotation gear 32, and the vertical rotation shaft 31.

Further, a vertical angle detector 35 (an encoder, for instance) for detecting a vertical angle (an angle in the rotating direction around the vertical rotation shaft 31) is provided between the vertical rotation shaft 31 and the frame unit 24. A relative rotation angle of the laser scanner 3 in the vertical direction with respect to the frame unit 24 is detected by the vertical angle detector 35.

The horizontal motor 29, the vertical motor 34, the horizontal angle detector 26 and the vertical angle detector 35 are electrically connected to an arithmetic control module 40 (to be described later), and the horizontal motor 29 and the vertical motor 34 are driven/controlled by the arithmetic control module 40 in such a manner that a required rotation amount is obtained at a required timing.

The rotation amount of the horizontal motor 29 (that is, a horizontal angle of the frame unit 24) is detected by the horizontal angle detector 26. The rotation amount of the vertical motor 34 (that is, a vertical angle of the laser scanner 3) is detected by the vertical angle detector 35.

The detection results of the horizontal angle detector 26 and the vertical angle detector 35 are input into the arithmetic control module 40, respectively. It is to be noted that a rotary driving module is configured by the horizontal motor 29 and the vertical motor 34. Further, an angle detector for detecting the vertical rotation angle and the horizontal rotation angle of the laser scanner 3, that is, a directional angle detector is configured by the horizontal angle detector 26 and the vertical angle detector 35.

A description will be given on an outline configuration of the laser scanner 3 by referring to FIG. 6.

The laser scanner 3 includes a distance measuring light projecting module 37, a light receiving module 38, a distance measurement calculating module 39, an arithmetic control module 40, a storage module 41, an image pickup control module 42, an image processing module 43, a communication module 44, an optical axis deflector 45, an attitude detector 46, a measuring direction image pickup module 47, a projecting direction detecting module 48, and a motor driver 49, and they are accommodated in a casing 51 and integrated. It is to be noted that, the distance measuring light projecting module 37, the light receiving module 38, the distance measurement calculating module 39, the optical axis deflector 45 and the like make up a distance measuring module 52 which functions as an electronic distance meter. It is to be noted that the distance measuring module 52 corresponds to a distance measuring module 12 in the first embodiment.

The distance measuring light projecting module 37 has a projection optical axis 54, and a light emitter 55, for instance, a laser diode (LD), is disposed on the projection optical axis 54 as a distance measuring light source. Further, a projecting lens 56 is disposed on the projection optical axis 54. Further, a first reflection mirror 57 is disposed on the projection optical axis 54 as a deflecting optical component. A second reflection mirror 58, as a deflecting optical component, is disposed at a position where the projection optical axis 54 as defected by the first reflection mirror 57 crosses a light receiving optical axis 61 (to be described later). The projection optical axis 54 is deflected by the second reflection mirror 58 so as to coincide with the light receiving optical axis 61. The first reflection mirror 57 and the second reflection mirror 58 make up a projection optical axis deflector.

A CPU specialized for this instrument or a general-purpose CPU is used as the distance measurement calculating module 39. The distance measurement calculating module 39 drives the light emitter 55, and the light emitter 55 emits a laser beam. The distance measuring light projecting module 37 projects the laser beam emitted from the light emitter 55 as a distance measuring light 59. It is to be noted that, as the laser beam, any one of a continuous light or a pulsed light or an intermittent modulated light (that is, a burst light) disclosed in Japanese Patent Application Publication No. 2016-161411 may be used.

A description will be given on the light receiving module 38. The light receiving module 38 has an optical system and a photodetector for receiving a reflected distance measuring light 62 from a target 6. The light receiving module 38 has the light receiving optical axis 61. The light receiving optical axis 61 coincides with the projection optical axis 54 deflected by the first reflection mirror 57 and the second reflection mirror 58. It is to be noted that an axis of a state where the projection optical axis 54 coincides with the light receiving optical axis 61 is a distance measuring optical axis 63.

The optical axis deflector 45 is disposed on the reference optical axis "O". The optical axis deflector 45 deflects a laser beam, which is transmitted through the optical axis deflector 45, by an optical action of a prism (to be described later). A straight optical axis transmitted through a center of the optical axis deflector 45 is the reference optical axis "O". The reference optical axis "O" coincides with the projection optical axis 54, the light receiving optical axis 61 or the distance measuring optical axis 63 when they are not deflected by the optical axis deflector 45. It is to be noted that the optical axis deflector 45 corresponds to a distance measuring light deflecting module 13 in the first embodiment.

The reflected distance measuring light 62 is transmitted through the optical axis deflector 45 and is incident to the light receiving module 38. Further, a focusing lens 64 is disposed on the light receiving optical axis 61, and a photodetector 65 such as a photodiode (PD) or an avalanche photodiode (APD), for instance, is provided on the light receiving optical axis 61.

The focusing lens 64 focuses the reflected distance measuring light 62 on the photodetector 65. The photodetector 65 receives the reflected distance measuring light 62 and produces a photodetecting signal. The photodetecting signal is inputted into the distance measurement calculating module 39, and the distance measurement calculating module 39 calculates a reciprocating time of the distance measuring light based on the photodetecting signal and measures a distance to the target 6 based on the reciprocating time and the light velocity.

The communication module 44 transmits image data acquired by the measuring direction image pickup module 47, image data processed by the image processing module 43, and distance measurement data acquired by the distance measuring module 52 to the terminal 23 and receives data such an operation command or the like from the terminal 23.

As the storage module 41, a storage medium such as an HDD, a semiconductor memory, a memory card, a CD, or a DVD is used. In the storage module 41, various types of programs are stored. These programs include an image pickup control program, an image processing program, a distance measuring program, a display program, a communication program, an operation command creating program, a tilt angle calculation program for calculating a tilt angle and a tilt direction of the laser scanner 3 based on an attitude detection result from the attitude detector 46, a measurement program for carrying out the distance measurement, a deflection control program for controlling a deflecting operation of the optical axis deflector 45, a calculation program for executing various types of calculations, a searching program for searching the object to be measured, a tracking program for tracking the object to be measured, and other programs.

Further, in the storage module 41, various types of data, such as the measurement data, angle measurement data, and the image data are stored.

As the arithmetic control module 40, a CPU specialized for this instrument, a general-purpose CPU, or the like is used. The arithmetic control module 40 develops and executes the various types of programs according to an operating state of the laser scanner 3, performs a control of the distance measuring light projecting module 37 by the laser scanner 3, a control of the light receiving module 38, a control of the distance measurement calculating module 39, a control of the optical axis deflector 45, a control of the measuring direction image pickup module 47, and the like, and carries out a search, a tracking, and a distance measurement of the object to be measured.

Further, the arithmetic control module 40, the storage module 41 and the like corresponds to an arithmetic control module 11 in the first embodiment.

A description will be given on the optical axis deflector 45 by referring FIG. 6.

The optical axis deflector 45 is configured by a pair of optical prisms 67 and 68. Each of the optical prisms 67 and 68 has a disk shape with the same diameter and is disposed concentrically each other and crosses the distance measuring optical axis 63 at a right angle on the distance measuring optical axis 63 (that is, the reference optical axis "O") deflected by the second reflection mirror 58. Further, the optical prisms 67 and 68 are arranged in parallel at a predetermined interval.

The optical prisms 67 and 68 are formed from three triangular prisms arranged in parallel, respectively. Each of the triangular prisms is formed from an optical glass and has optical characteristics of the same deflection angle.

A width and a shape of each of the triangular prisms may be the same or may be different. The widths of the triangular prisms positioned at a center are larger than a beam diameter of the distance measuring light 59, and the distance measuring light 59 is adapted to transmit only a central part of the triangular prisms. It is to be noted that the triangular prisms in a surrounding may be constituted by a plurality of small triangular prisms.

Further, the triangular prisms at the center may be made of an optical glass with high accuracy, and the triangular prisms in the surrounding may be made of an optical plastic. That is because a distance from the optical axis deflector 45 to the object to be measured is large, optical characteristics of the central part of the triangular prisms require an accuracy, but on the other hand, a distance from each triangular prism in the surrounding to the photodetector 65 is small, and highly accurate optical characteristics are not required.

A central part of the optical axis deflector 45 is a distance measuring light deflector, which is a first optical axis deflector through which the distance measuring light 59 is transmitted and is projected. A portion excluding the central part of the optical axis deflector 45 (the triangular prisms in the surrounding) is a reflected distance measuring light deflector, which is a second optical axis deflector through which the reflected distance measuring light 62 is transmitted and enters.

The respective optical prisms 67 and 68 are arranged rotatably individually and independently around the reference optical axis "O". The optical prisms 67 and 68 are controlled respectively by the arithmetic control module 40 regarding a rotating direction, a rotation amount and a rotating speed. Thereby, the optical prisms 67 and 68 deflect the projection optical axis 54 of the projected distance measuring light 59 in an arbitrary direction and also deflect the light receiving optical axis 61 of the received reflected distance measuring light 62 in parallel with the projection optical axis 54.

Further, when a rotation of the optical prisms 67 and 68 is continuously controlled and the transmitted distance measuring light 59 is continuously deflected while continuously irradiating the distance measuring light 59, the distance measuring light 59 can be scanned in a predetermined pattern. Further, distance measurement data (point cloud data) is acquired along a scanning path (a scan locus).

Outer shapes of the optical prisms 67 and 68 are circular with the distance measuring optical axis 63 (the reference optical axis "O") as a center, respectively, and diameters of the optical prisms 67 and 68 are set so that a sufficient light amount can be obtained by considering a spread of the reflected distance measuring light 62.

A ring gear 69 is fitted on an outer periphery of the optical prism 67, and a ring gear 70 is fitted on an outer periphery of the optical prism 68.

A driving gear 71 is meshed with the ring gear 69, and the optical prism 67 is rotated by a motor 73 via the driving gear 71 and the ring gear 69. Similarly, a driving gear 72 is meshed with the ring gear 70, and the optical prism 68 is rotated by a motor 74 via the driving gear 72 and the ring gear 70. The motors 73 and 74 are electrically connected to the motor driver 49.

As the motors 73 and 74, motors which are capable of detecting the rotation angle are used or motors which rotate corresponding to a driving input value such as a pulse motor, for instance, are used. Alternatively, a rotation angle detector for detecting rotation amounts (rotation angles) of the motors such as an encoder, for instance, may be used and the rotation amounts of the motors 73 and 74 may be detected by the rotation angle detector. The rotation amounts of the motors 73 and 74 are detected, respectively, and the motors 73 and 74 are individually controlled by the motor driver 49.

Further, rotation angles of the optical prisms 67 and 68 are detected via the rotation amounts of the motors 73 and 74, that is, rotation amounts of the driving gears 71 and 72. It is to be noted that the encoder may be attached directly to the ring gears 69 and 70, respectively, in such a manner that the rotation angles of the ring gears 69 and 70 are directly detected by the encoder.

The driving gears 71 and 72 and the motors 73 and 74 are provided at positions not interfering with the distance measuring light projecting module 37 such as at lower positions of the ring gears 69 and 70, for instance.

The projecting lens 56, the first reflection mirror 57, the second reflection mirror 58, the optical axis deflector 45 and the like make up a projection optical system. Further, the reflected distance measuring light deflector, the focusing lens 64 and the like make up a light receiving optical system.

The distance measurement calculating module 39 controls the light emitter 55 and makes the light emitter 55 pulse-emit or burst-emit (intermittently emit) the laser beam as the distance measuring light 59. The projection optical axis 54 (that is, the distance measuring optical axis 63) is deflected by the central part of the triangular prisms (the distance measuring light deflector) in such a manner that the distance measuring light 59 is directed toward the target 6. The distance measurement is performed in a state where the distance measurement optical axis 63 sights the target 6.

The reflected distance measuring light 62 reflected from the target 6 enters the light receiving module 38 through the triangular prisms in the surrounding (that is, the reflected distance measuring light deflector), and the reflected distance measuring light 62 is focused on the photodetector 65 by the focusing lens 64.

The photodetector 65 sends out the photodetecting signal to the distance measurement calculating module 39, the distance measurement calculating module 39 performs a distance measurement of a measuring point (a point irradiated with the distance measuring light) per each pulsed light based on the photodetecting signal from the photodetector 65, and the distance measurement data is stored in the storage module 41.

The projecting direction detecting module 48 counts driving pulses inputted into the motors 73 and 74 and detects the rotation angles of the motors 73 and 74. Alternatively, the projecting direction detecting module 48 detects the rotation angles of the motors 73 and 74 based on a signal from the encoder. Further, the projecting direction detecting module 48 calculates rotational positions of the optical prisms 67 and 68 based on the rotation angles of the motors 73 and 74.

Further, the projecting direction detecting module 48 calculates a deflection angle and a projecting direction (deflecting direction) of the distance measuring light 59 with respect to the reference optical axis "O" per each pulsed light based on refractive indexes of the optical prisms 67 and 68, the rotational position of when the optical prisms 67 and 68 are integrated, and a relative rotation angle between the both optical prisms 67 and 68 in real time. A calculation result (an angle measurement result) is associated with the distance measurement result and is inputted into the arithmetic control module 40. It is to be noted that in a case where the distance measuring light 59 is burst-emitted, the distance measurement is performed per each intermittent distance measuring light.

By controlling the rotating directions and the rotating speeds of the motors 73 and 74 and a rotation ratio between the motors 73 and 74, the arithmetic control module 40 controls a relative rotation and an entire rotation of the optical prisms 67 and 68 and controls a deflecting action by the optical axis deflector 45. Further, the arithmetic control module 40 calculates a horizontal angle and a vertical angle of the measuring point with respect to the reference optical axis "O" from the deflection angle and the projecting direction of the distance measuring light 59. Further, the arithmetic control module 40 associates the horizontal angle and the vertical angle regarding the measuring point with the distance measurement data and can acquire three-dimensional data of the measuring point. Thus, the laser scanner 3 functions as a total station.

Further, a scan can be performed in an arbitrary pattern within a range of a maximum deflection angle of the optical axis deflector 45 as described later.

Next, a description will be given on the attitude detector 46. The attitude detector 46 detects a tilt angle of the laser scanner 3 with respect to the horizontal or the vertical, and the detection result is inputted to the arithmetic control module 40. It is to be noted that as the attitude detector 46, an attitude detector disclosed in Japanese Patent Application Publication No. 2016-151423 can be used.

The attitude detector 46 will be described in brief. The attitude detector 46 has a frame 76. The frame 76 is fixed to the casing 51 or fixed to a structural component and is integrated with the laser scanner 3.

A sensor block 77 is mounted on the frame 76 via a gimbal. The sensor block 77 is capable of rotating freely by 360° or over 360° in two directions around two axes crossing each other at a right angle, respectively.

A first tilt sensor 78 and a second tilt sensor 79 are mounted on the sensor block 77. The first tilt sensor 78 is a sensor which detects the horizontal with high accuracy, for instance, a tilt detector which makes a detection light enter a horizontal liquid surface, and detects the horizontal according to a change of a reflection angle of a reflected light or an air bubble tube which detects the tilt according to a positional change of sealed air bubbles. Further, the second tilt sensor 79 is a sensor which detects a tilt change with high responsiveness, for instance an acceleration sensor.

Each of relative rotation angles of the two axes of the sensor block 77 with respect to the frame 76 are configured to be detected by encoders 80 and 81, respectively.

Further, motors (not shown) which rotate the sensor block 77 in order to maintain the sensor block 77 horizontally are provided in relation with the two axes, respectively. The motors are controlled by the arithmetic control module 40 in such a manner that the sensor block 77 is maintained horizontally based on detection results from the first tilt sensor 78 and the second tilt sensor 79.

In a case where the sensor block 77 is tilted (in a case where the laser scanner 3 is tilted), the relative rotation angle of each axial direction of the frame 76 with respect to the sensor block 77 (horizontal) is detected by the encoders 80 and 81, respectively. Based on the detection results of the encoders 80 and 81, the tilt angles of the laser scanner 3 with respect to the two axes are detected and the tilt direction of the laser scanner 3 is determined by synthesizing the tilts of the two axes.

The sensor block 77 is capable of rotating freely by 360° or over 360° with respect to the two axes and hence, whatever the attitude detector 46 takes any attitude or even if the attitude detector 46 is inverted upside down, for instance, the attitude detector 46 is capable of an attitude detection (the tilt angle and the tilting direction with respect to the horizontal) in all the directions.

In the attitude detection, in a case where high responsiveness is required, the attitude detection and an attitude control are performed based on the detection result of the second tilt sensor 79, but the second tilt sensor 79 has a detection accuracy poorer than the first tilt sensor 78 in general.

The attitude detector 46 includes the first tilt sensor 78 with high accuracy and the second tilt sensor 79 with high responsiveness. Thereby, it is possible to perform the attitude control based on the detection result of the second tilt sensor 79 and further, to perform the attitude detection with high accuracy by the first tilt sensor 78.

The detection result of the second tilt sensor 79 can be calibrated based on the detection result of the first tilt sensor 78. That is, if the relationship between a detected tilt angle of the second tilt sensor 79 and a tilt angle, which is obtained based on the horizontal detection by the first tilt sensor 78 and the detection results of the encoders 80 and 81, is obtained in advance, the arithmetic control module 40 can calibrate the tilt angle detected by the second tilt sensor 79, and an accuracy of the attitude detection with high responsiveness by the second tilt sensor 79 can be improved based on this calibration. In a state where there is a small environmental change (a temperature or the like), the tilt detection may be performed based on the detection result of the second tilt sensor 79 and a correction value.

The arithmetic control module 40 controls the motors based on the signal from the second tilt sensor 79 when a tilt fluctuation is large and when the tilt change is rapid. Further, the arithmetic control module 40 controls the motors based on the signal from the first tilt sensor 78 when the tilt fluctuation is small and when the tilt change is mild, that is, in a state where the first tilt sensor 78 is capable of following up. It is to be noted that by calibrating the tilt angle detected by the second tilt sensor 79 at all times, the attitude detection by the attitude detector 46 may be performed based on the detection result from the second tilt sensor 79.

In the storage module 41, comparison data indicating a comparison result between the detection result of the first tilt sensor 78 and the detection result of the second tilt sensor 79 is stored. The detection result by the second tilt sensor 79 is calibrated based on the signal from the first tilt sensor 78. By this calibration, the detection result by the second tilt sensor 79 can be improved to the detection accuracy of the first tilt sensor 78. Thus, in the attitude detection by the attitude detector 46, high responsiveness can be realized while high accuracy is maintained.

The attitude detector 46 detects an attitude of the laser scanner 3 in real time. Further, since the attitude of the laser scanner 3 can be detected in real time, a measured value can be corrected based on a result detected by the attitude detector 46 in real time. Therefore, when installing the laser scanner 3, a leveling is no longer required.

The measuring direction image pickup module 47 has a first image pickup optical axis 83 in a predetermined relationship with the reference optical axis "O" of the laser scanner 3 and an image pickup lens 84 and an image pickup element 85 arranged on the first image pickup optical axis 83. The measuring direction image pickup module 47 is a camera having a field angle 50° to 60°, for instance, substantially equal to a maximum deflection angle $\theta/2$ ($\pm 30°$, for instance) of the optical prisms 67 and 68. The measuring direction image pickup module 47 can acquire a still image, a continuous image, and a video image.

The relationship among the first image pickup optical axis 83, the projection optical axis 54 and the reference optical axis "O" is known, the first image pick up optical axis 83, the projection optical axis 54 and the reference optical axis "O" are parallel with each other, and the distance between each of the optical axes has a known value.

The image pickup control module 42 controls an image pickup of the measuring direction image pickup module 47. In a case where the measuring direction image pickup module 47 picks up the video image or the continuous image, the image pickup control module 42 synchronizes a timing of acquiring a frame image constituting the video image or the continuous image with a timing of scanning by the laser scanner 3 and of performing the distance measurement (the timing of measuring a distance per a pulsed laser beam). The arithmetic control module 40 also performs associating the image with the measurement data (the distance measurement data, the angle measurement data).

The image pickup element 85 of the measuring direction image pickup module 47 is a CCD or a CMOS sensor which is an aggregate of pixels and each pixel can specify a position on the image pickup element 85. Each pixel has pixel coordinates in a coordinate system with the first image pickup optical axis 83 as an origin, for instance. The photodetecting signal from each pixel includes an information of the pixel coordinates. Therefore, a position of each pixel on the image pickup element 85 is specified by the pixel coordinates included in the photodetecting signal. Further, since the relationship between the first image pickup optical axis 83 and the reference optical axis "O" is known, a mutual association between the measuring position by the distance measuring module 52 and the position on the image pickup element 85 can be made. An image signal outputted from the image pickup element 85 includes the information of the pixel coordinates. The image signal is inputted into the image processing module 43 via the image pickup control module 42.

A description will be given on a deflecting action of the optical axis deflector 45 and a scanning action by referring to FIG. 6, FIG. 7A and FIG. 7B.

Figure 6:
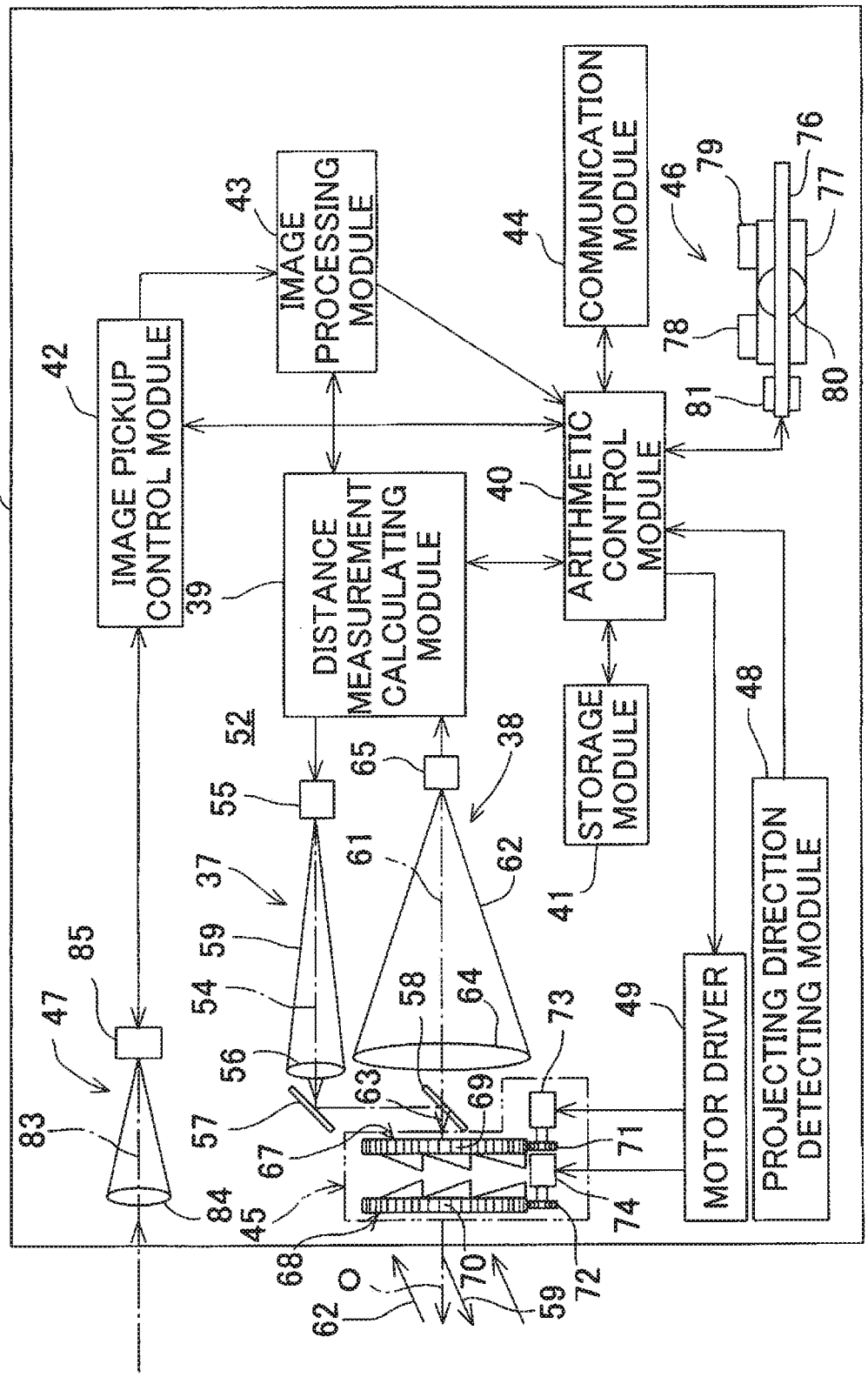
FIG. 6 is a schematical block diagram of the laser scanner.

In a state of the optical prisms 67 and 68 (a state where directions of the optical prisms 67 and 68 are 180° different (when a relative rotation angle is 180°)) shown in FIG. 6, mutual optical actions of the optical prisms 67 and 68 are canceled out, and a deflection angle becomes 0°. Therefore, an optical axis (the distance measuring optical axis 63) of a laser beam, which is projected and received through the optical prisms 67 and 68, coincides with the reference optical axis "O".

Further, in a state where any one of the optical prisms 67 and 68 is rotated 180° with respect to the other (the prisms have the same directions) from the state in FIG. 6, a maximum deflection angle (for instance, 30° with respect to the reference optical axis "O") can be obtained.

Therefore, by a relative rotation between the optical prisms 67 and 68, the distance measuring optical axis 63 is deflected between 0° to 30°, and an integral rotation of the optical prisms 67 and 68 changes the deflecting direction.

Therefore, by controlling the relative rotation angle between the optical prisms 67 and 68 and an integral rotation angle of the optical prisms 67 and 68, the distance measuring optical axis 63 can be deflected in a maximum deflection angle range in an arbitrary direction. That is, the distance measuring optical axis 63 can be sighted to the target 6 in the arbitrary direction.

Further, by carrying out the relative rotation and the integral rotation of the optical prisms 67 and 68 while irradiating the distance measuring light 59, the distance measuring light 59 can be scanned in the arbitrary direction and in an arbitrary pattern.

Figure 7A:
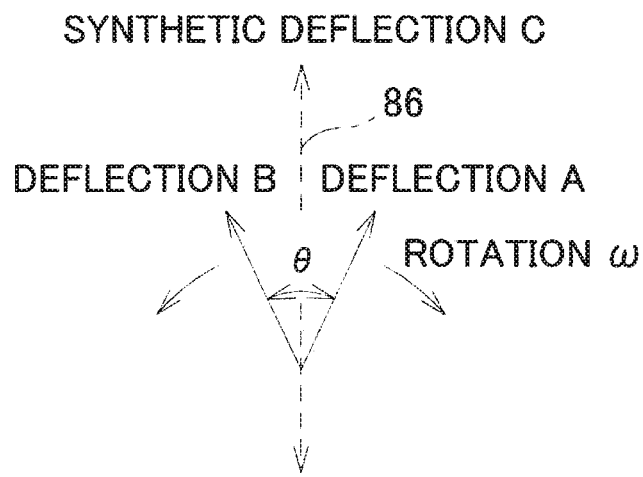
FIGS. 7A and 7B are explanatory drawings to show a deflecting action of an optical axis deflector of the laser scanner.

For instance, as shown in FIG. 7A, assuming that a relative rotation angle between the optical prisms 67 and 68 is "θ" and a deflection "A" and a deflection "B" are obtained by the optical prisms 67 and 68 respectively, an actual deflection 86 of the distance measuring optical axis 63 becomes a synthetic deflection "C", and a magnitude of a deflection angle is determined depending on the relative rotation angle "θ". Therefore, when the optical prisms 67 and 68 are synchronously rotated forwardly and reversely at an equal speed, the distance measuring optical axis 63 (the distance measuring light 59) is linearly reciprocally scanned in a direction of the synthetic deflection "C".

Further, when the optical prism 67 and the optical prism 68 are integrally rotated by the motors 73 and 74 in a state where the positional relationship between the optical prism 67 and the optical prism 68 is fixed (that is, in a state where the deflection angle as obtained by the optical prism 67 and the optical prism 68 is fixed), the distance measuring optical axis 63 (the distance measuring light 59) is scanned with a circle with the reference optical axis "O" (see FIG. 4) as a center. That is, a circular pattern as explained in the first embodiment is obtained. Further, in a case where a radius of the circular pattern is changed, changing a relative angle between the optical prisms 67 and 68 would suffice.

Figure 7B:
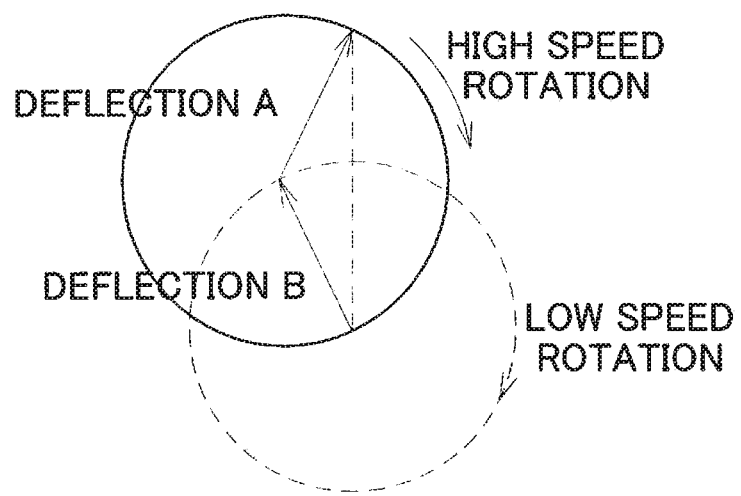

Further, as shown in FIG. 7B, when the optical prism 68 is rotated at a rotating speed lower than a rotating speed of the optical prism 67, the distance measuring light 59 is rotated while the angular difference "θ" is gradually increased. Therefore, a scan locus of the distance measuring light 59 becomes spiral.

Further, by individually controlling the rotating directions, the rotating speeds and the rotation speed ratio of the optical prism 67 and the optical prism 68, various two-dimensional scan patterns of the scan locus of the distance measuring light 59 with the reference optical axis "O" as a center can be obtained.

Figure 8:
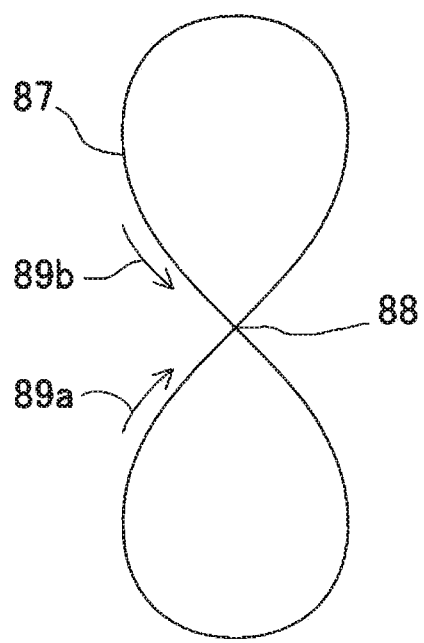
FIG. 8 is a drawing to show an example of a pattern obtained by the optical axis deflector.

For instance, when a rotation ratio of the optical prism 67 and the optical prism 68 is set to 1:2, a two-dimensional closed loop scan pattern 87 with a shape of numeral 8 as shown in FIG. 8 can be obtained. Further, the scan pattern 87 has an intersection 88 where an outward 89a crosses an inward 89b, and the intersection 88 is a center of the scan pattern 87 and coincides with the reference optical axis "O".

Figure 9:
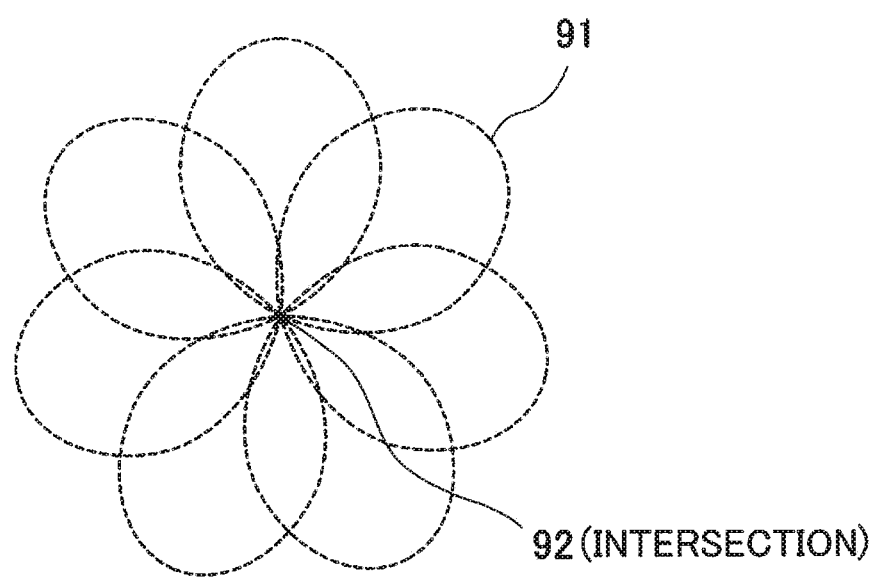
FIG. 9 is a drawing to show an example of another pattern obtained by the optical axis deflector.

Further, when the one optical prism 67 in the optical prism 67 and the optical prism 68 is rotated by 25 rotations and the other optical prism 68 is rotated by 5 rotations in the opposite direction, a flower petal-shaped two-dimensional closed loop scan pattern 91 (flower petal pattern 91 (a hypotrochoid curve)) as shown in FIG. 9 is obtained. The flower petal pattern 91 has also an intersection 92 at a center.

Further, a maximum range where a two-dimensional scan is possible in a state where the laser scanner 3 is fixed is the maximum deflection angle range of the optical axis deflector 45.

Although the center of the scan pattern 87 and the center of the flower petal pattern 91 are explained as the reference optical axis "O", the distance measuring light 59 can be freely deflected by controlling the rotation of each of the optical prisms 67 and 68. As a result, the two-dimensional scan can be carried out in a part of a range within the maximum deflection angle range. Hereinafter, a scan in the part of the range is referred to as a local scan.

Therefore, the local scan is carried out around a scan center optical axis 14, which is deflected at a predetermined angle with respect to the reference optical axis "O". The scan pattern is the scan pattern 87 with a shape of numeral 8 and the flower petal pattern 91, for instance, and these scan patterns can also be rotated around the scan center optical axis 14.

Next, a description will be given on a measuring operation of the surveying system 1 according to the second embodiment.

As a preparation for starting a measurement, the target instrument 2 is captured by the measuring direction image pickup module 47. Since a field angle of the measuring direction image pickup module 47 is a wide field angle of 50° to 60°, it would suffice if a direction of the laser scanner 3 approximately directs toward the target instrument 2. Further, since the maximum deflection angle of the optical axis deflector 45 is the same as or approximately the same as the field angle of the measuring direction image pickup module 47, when the measuring direction image pickup module 47 captures the target instrument 2, the target instrument 2 is captured in a searchable range of the laser scanner 3.

In a state where the target instrument 2 is captured by the measuring direction image pickup module 47, a search and a sighting of the target 6 are carried out by the laser scanner 3. While searching and sighting, the laser scanner 3 is in a fixed state.

A scan pattern to search the target 6 is selected. The scan pattern may be set in advance or may be selected according to a shape and properties of the target 6 or according to a measurement state and the like.

For instance, as a pattern for search-scanning an entire range of the maximum deflection angle range of the optical axis deflector 45, a spiral pattern as shown in FIG. 7B is selected. That is, the search-scan is carried out while the radius is gradually reduced from the radius of the circular scan of the maximum deflection angle. Since the target instrument 2 exists within the maximum deflection angle range, a scan pass firstly passes the pole 5 in a process of reducing the circular scan.

A movement of the optical prism 67 and a movement of the optical prism 68 while searching are only rotations in one direction, the optical prisms 67 and 68 are light in weight, and hence a high-speed rotation is possible. Therefore, a high-speed scan (a high-speed search) is possible.

The positions through which the circular scan passes are two upper and lower positions on the pole 5, and the distance measuring light 59 is reflected at each position. The reflected distance measuring light 62 is received by the light receiving module 38.

Further, by scanning across the pole 5, point cloud data which crosses the pole 5 can be acquired. By distance measurement values of this point cloud data, a cross-sectional shape of the pole 5 can be measured, that is, a thickness (diameter) of the pole 5 can be measured. Therefore, in a case where a scan path crosses only either of an upper part 5a or a lower part 5b of the pole 5, it is possible to determine, from the measured thickness of the pole 5, in which either of the up or down direction the scan center optical axis 14 should be moved.

The arithmetic control module 40 obtains, from the projecting direction detecting module 48, a deflection angle and a deflecting direction with respect to the reference optical axis "O" when the light receiving module 38 receives the reflected distance measuring light 62. That is, a distance to the pole 5 and a horizontal angle of the pole 5 are measured by the reflected distance measuring light 62.

Further, a tilt and a tilt direction of the pole 5 are detected based on measurement results obtained at the two upper and lower positions.

The arithmetic control module 40 controls the optical axis deflector 45 in such a manner that a deflection angle and a deflecting direction of the scan center optical axis 14 (see FIG. 2A, FIG. 2B and FIG. 2C) of the circular scan coincide with the deflection angle and the deflecting direction obtained from the projecting direction detecting module 48.

The scan center optical axis 14 of the circular scan is matched with the pole 5 based on the horizontal angle of the pole 5, and the scan center optical axis 14 is moved along the pole 5. Further, a diameter of the circular scan is reduced in accordance with a size of the target 6 based on a distance measurement result.

When the scan center optical axis 14 is moved in an up-and-down direction along the pole 5, the circular scan can capture the target 6. It can be made determined by detecting a change in distance measurement value whether the circular scan captures the target 6.

A process of matching (sighting) the scan center optical axis 14 with the target 6 is the same as a process in the first embodiment, and hence a description thereof will be omitted.

In the second embodiment, the target instrument 2 does not include an air bubble tube 7. In the second embodiment, the measurement of the target 6 and the measurement of a tilt of the target 6 (that is, the pole 5) are simultaneously performed by scanning the distance measuring light.

In case of performing the measurement of the target 6, the scan pattern is changed to a scan pattern 87 with a shape of a numeral 8 as shown in FIG. 8. The scan pattern 87 is a pattern which forms an intersection 88 on the scan center optical axis 14. Further, as a size of the scan pattern 87, a local scan which is limited in such a manner that an upper path and a lower path cross the pole 5 including the target 6 is performed.

It is to be noted that a scan pattern in searching may be the scan pattern 87. Further, in initial searching, a scan pattern 87 which is formed in a maximum deflection angle range may be used and may be gradually reduced.

Figure 10:
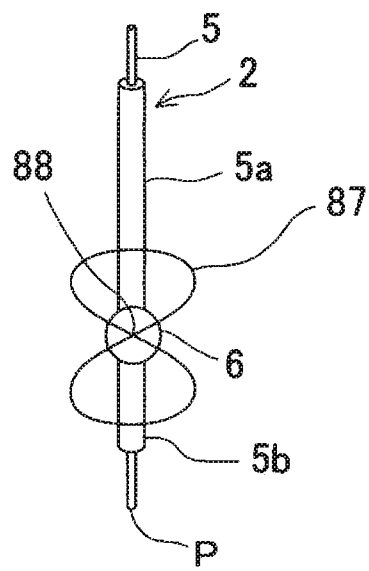
FIG. 10 is a drawing to show a relationship between a target instrument and a scan pattern at the time of measuring a target.

In the scan pattern 87, an outward 89a and an inward 89b intersect with each other on the target 6, and the upper path and the lower path of the scan pattern 87 cross the pole 5 (see FIG. 10).

Therefore, from the target instrument 2, the two upper and lower points of the pole 5 above and below the target 6 and the reflected distance measuring light 62 from the surface of the target 6 are obtained.

The distance measurement values of the two upper and lower points of the pole 5 are obtained, and vertical angles and horizontal angles of the two points are measured by the projecting direction detecting module 48. The tilt of the pole 5 is measured from the measurement results of the two points of the pole 5.

Further, the distance measuring light 59 scans the surface of the target 6, and the point cloud data along a scan locus is acquired by the reflected distance measuring light 62 from the surface of the target 6. A spherical curved surface and a center of the spherical curved surface (the target 6) are calculated based on the point cloud data and a diameter of the target 6, and further a distance to the center of the target 6 is calculated. The calculation of the distance to the center of the target 6 may be the same as the calculation in the first embodiment.

Further, a distance from the laser scanner 3 to the target 6 is corrected based on a known distance between the center of the target 6 and a lower end of the pole 5 and on the tilt of the pole 5, and accurate three-dimensional coordinates of the measuring point "P" are determined.

The tilt of the pole 5 as obtained here is a tilt with respect to the reference optical axis "O", and the reference optical axis "O" itself, that is, the laser scanner 3 itself is not necessarily horizontal. A tilt angle and a tilt direction of the reference optical axis "O" with respect to the horizontal can be measured by the attitude detector 46.

Therefore, by correcting the measurement result based on a detection result of the attitude detector 46 with respect to the horizontal and based on the tilt angle and the tilt direction of the reference optical axis "O" with respect to the horizontal or the vertical, it is possible to accurately measure a distance, an elevation angle and a horizontal angle regarding a measuring point (a point indicated by the lower end of the pole 5) "P" of the laser scanner 3 irrespective of the tilt of the pole 5.

In a case where the measurement of the measuring point "P" is completed and the target instrument 2 moves to a next measuring point, the scan pattern is changed to a circular pattern, and the circular scan is carried out.

The spherical surface is circularly scanned, and the target 6 is tracked in such a manner that a center of the circular scan becomes the center of the target 6 based on a distance measurement result of the circular scan, which is the same as the first embodiment.

Further, when a tracking range exceeds a deflection range (a maximum deflection angle of the optical axis deflector 45) of the optical axis deflector 45, by a cooperation between the tracking using the optical axis deflector 45 and a rotation of the laser scanner 3 itself using the installation base 22, the tracking of the target instrument 2 is performed.

The arithmetic control module 40 drives the horizontal motor 29 and the vertical motor 34 via the motor driver 49, and the laser scanner 3 itself is rotated in such a manner that the laser scanner 3 tracks the target 6.

In this case, a deflection angle and a deflecting direction between the scan center optical axis 14 and the reference optical axis "O" are detected by the projecting direction detecting module 48. Therefore, in the tracking of the laser scanner 3 itself, a driving of the horizontal motor 29 and the vertical motor 34 is controlled in such a manner that the deflection angle between the reference optical axis "O" and the scan center optical axis 14 becomes 0.

Even in the tracking exceeding the deflection range of the optical axis deflector 45, first, since the optical axis deflector 45 tracks at a high speed, the trackability of the laser scanner 3 is not deteriorated.

In the second embodiment, the search, the measurement and the tracking of the target 6 can be performed only by the measurement data which is acquired by the scan.

Further, since the target instrument 2 need not to be vertically supported, it is possible to measure a measuring point where the pole 5 cannot be vertically supported. For instance, a measurement is possible even at a measuring point on a vertical wall surface, a measuring point on a ceiling surface, a corner of a wall, a corner of a ceiling and the like.

Therefore, even in the measurement at a position where the target instrument 2 cannot be supported upright, when a measuring point can be indicated by the lower end (the upper end, in a case where a ceiling is measured) of the pole 5, an accurate measurement can be carried out.

Figures 11A, 11B, 11C:
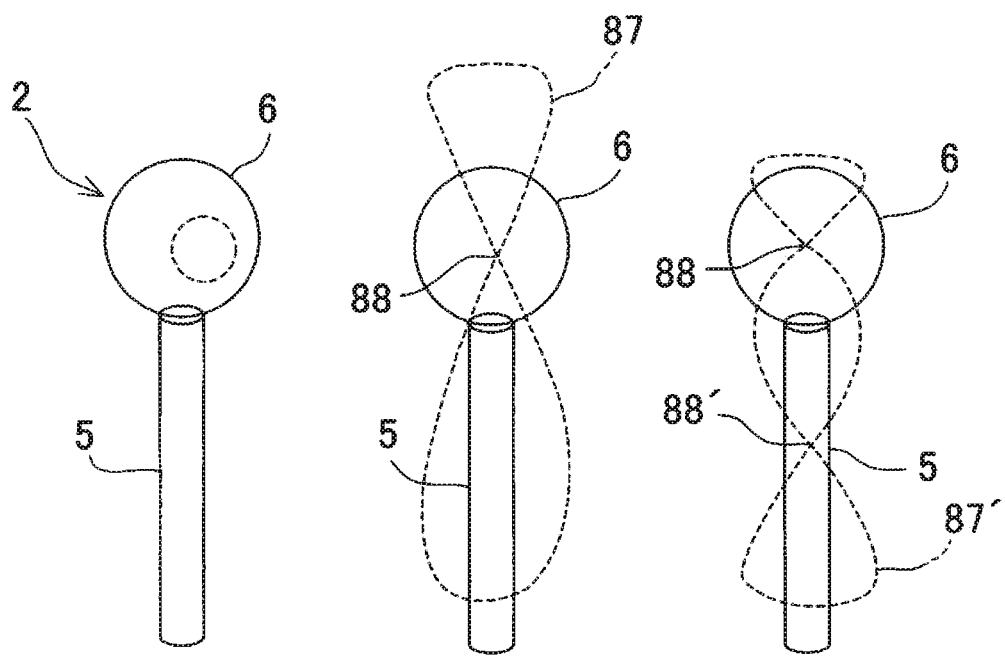
FIG. 11A, FIG. 11B and FIG. 11C are drawings to show a relationship between a modification of the target instrument and a scan pattern.

FIG. 11A, FIG. 11B and FIG. 11C show a modification of a target instrument 2.

In the target instrument 2, a target 6 is provided at an end, for instance, at an upper end of a pole 5.

FIG. 11A shows a tracking state and the target 6 is circularly scanned.

FIG. 11B and FIG. 11C show a measurement state. In the measurement state, a center of the target 6 is measured and a tilt of the pole 5 is also measured, and further at least two points are required in a measurement of the tilt of the pole 5.

In FIG. 11B, a scan pattern 87 with a shape of a numeral 8 is selected as a scan pattern in the measurement, and a scan center optical axis 14 is directed in such a manner that an intersection 88 of the scan pattern 87 is positioned on a surface of the target 6 (preferably the intersection 88 becomes the center of the target 6).

When the surface of the target 6 is scanned in the scan pattern 87, point cloud data of the surface of the target 6 is acquired, and the center of the target 6 is calculated based on the point cloud data. Further, since a lower part of the scan pattern 87 passes through the pole 5, a pass point of the scan pattern 87 is measured. Therefore, the tilt of the pole 5 can be measured based on two points, which are the center of the target 6 and the pass point of the scan pattern 87 in the pole 5.

In FIG. 11C, a scan pattern 87' is selected in such a manner that three points of the pole 5 can be measured and two intersections 88 and 88' are formed.

When the positions of the three points of the pole 5 are obtained, an accuracy of a tilt measurement of the pole 5 is improved. It is to be noted that a pattern in the measurement is not limited to the scan pattern 87, and a scan pattern which has a scan path passing through the surface of the target 6 and a scan path crossing the pole 5 can suffice.

The invention claimed is:

1. A surveying system comprising a laser scanner for scanning a distance measuring light and for acquiring point cloud data and a target instrument having a target for reflecting said distance measuring light, wherein said target is a sphere having a known diameter, said laser scanner comprises a distance measuring module for projecting said distance measuring light, for receiving a reflected distance measuring light and for performing a distance measurement, an optical axis deflector which enables to two-dimensionally deflect said distance measuring light, and an arithmetic control module for controlling said optical axis deflector, and wherein said arithmetic control module is configured to perform a circular scan on a surface of said target by said optical axis deflector, to obtain a center of said target based on the point cloud data acquired by said circular scan and said diameter, and to measure a distance of the center of said target.

2. The surveying system according to claim 1, wherein, with respect to said moving target, said optical axis deflector is configured to direct a center of said circular scan to the center of said target in such a manner that distance measurement values of an entire circumference obtained by said circular scan become equal to each other.

3. The surveying system according to claim 1, wherein said target instrument further comprises a pole of which end indicates a measuring point and an air bubble tube provided on said pole, wherein the center of said target is positioned on an axis of said pole and is provided at a known position from the end of said pole, and wherein said laser scanner is configured to measure the center of said target and to carry out a measurement of said measuring point in a state where said pole is vertically supported.

4. The surveying system according to claim 1, wherein said optical axis deflector includes a biaxial galvanometer mirror.

5. The surveying system according to claim 1, wherein said optical axis deflector has a reference optical axis, said optical axis deflector comprises a pair of optical prisms rotatable around said reference optical axis and motors which individually and independently rotate said optical prisms, and wherein said arithmetic control module is configured to control a deflection of a distance measuring light by said optical axis deflector by controlling a rotating direction, a rotation speed and a rotation ratio of said pair of optical prisms, to perform a two-dimensional scan with a scan center optical axis as a center, and to control a deflection of said scan center optical axis with respect to said reference optical axis.

6. The surveying system according to claim 1, wherein said arithmetic control module is configured to scan said distance measuring light in a scan pattern with at least one intersection or to scan said distance measuring light in a circular pattern by said optical axis deflector.

7. The surveying system according to claim 6, wherein said arithmetic control module is configured to scan said distance measuring light by said optical axis deflector in such a manner that said intersection is formed on said target and a part of said scan pattern crosses said pole, to obtain the center of said target based on the point cloud data acquired by scanning said target, to carry out a measurement of said target, and to measure a tilt of said pole based on the center of said target and a distance measurement value obtained by crossing said pole.

8. The surveying system according to claim 6, wherein said arithmetic control module is configured to carry out a sighting and a tracking of said target by said circular scan and to carry out a measurement of said target in a scan pattern with at least one intersection.

* * * * *